(12) United States Patent
Ball

(10) Patent No.: US 7,976,713 B2
(45) Date of Patent: Jul. 12, 2011

(54) SECONDARY FILTERING AND DISCHARGING OF WASTEWATER

(75) Inventor: Eric S Ball, Roseburg, OR (US)

(73) Assignee: Orenco Systems Incorporated, Sutherlin, OR (US)

( * ) Notice: Subject to any disclaimer, the term of this patent is extended or adjusted under 35 U.S.C. 154(b) by 106 days.

(21) Appl. No.: 12/400,458

(22) Filed: Mar. 9, 2009

(65) Prior Publication Data

US 2010/0224577 A1   Sep. 9, 2010

(51) Int. Cl.
  *B01D 21/24* (2006.01)
  *B01D 36/04* (2006.01)
(52) U.S. Cl. ...... 210/804; 210/806; 210/299; 210/532.2
(58) Field of Classification Search .................. 210/603, 210/747, 800, 804, 806, 170.08, 256, 299, 210/305, 532.2
  See application file for complete search history.

(56) References Cited

U.S. PATENT DOCUMENTS

| | | | |
|---|---|---|---|
| 1,408,810 A | 3/1922 | Lawrence | |
| 1,677,626 A * | 7/1928 | Frappy | 210/532.2 |
| 1,902,171 A | 3/1933 | Kopp | |
| 2,185,785 A | 1/1940 | Dorr et al. | |
| 2,482,353 A | 9/1949 | Loelkes | |
| 2,631,976 A | 3/1953 | Elliott | |
| 2,767,801 A | 10/1956 | Eads | |
| 3,109,813 A * | 11/1963 | Bergsten et al. | 210/532.2 |
| 3,275,565 A | 9/1966 | Sailors | |
| 3,612,279 A | 10/1971 | Hostetter | |
| 3,662,890 A | 5/1972 | Grimshaw | |
| 4,179,372 A | 12/1979 | Rosaen | |
| 4,439,323 A | 3/1984 | Ball | |
| 4,710,295 A | 12/1987 | Zabel | |
| 4,715,966 A | 12/1987 | Bowman | |
| 4,867,871 A | 9/1989 | Bowne | |
| 4,895,645 A | 1/1990 | Zorich | |
| 5,198,113 A | 3/1993 | Daniels | |
| 5,207,896 A | 5/1993 | Graves | |
| 5,252,000 A | 10/1993 | Mohs | |
| 5,427,679 A | 6/1995 | Daniels | |
| 5,492,635 A | 2/1996 | Ball | |
| 5,531,894 A | 7/1996 | Ball et al. | |

(Continued)

OTHER PUBLICATIONS

Orenco Systems, Inc.; http://www.pumps.co.za/shop/store/comersus; 115710 Flow Inducer Sleeves—Heat shrink 100mm; p. 1; downloaded from the Internet on Feb. 12, 2009.

(Continued)

*Primary Examiner* — Christopher Upton
(74) *Attorney, Agent, or Firm* — Chernoff Vilhauer LLP

(57) ABSTRACT

Treating wastewater by receiving wastewater having a reduced concentration of waste solids into a secondary containment space and allowing the waste solids to distribute into a lower horizontal sludge layer, an upper horizontal scum layer, and a relatively clear horizontal layer of liquid therebetween; flowing the liquid from the relatively clear layer through at least one filter element enclosed in a housing the top of which is submerged below the wastewater level of the secondary containment space; and thereafter flowing the filtered effluent out of the housing. In some embodiments, the filtered effluent may be discharged from the secondary containment space using an effluent pump configured with a conventional flow inducer or, alternatively, using an effluent pump sealably configured with a shortened flow inducer thereby allowing discharge of the filtered effluent to a wastewater level below that of the pump's intake.

18 Claims, 6 Drawing Sheets

U.S. PATENT DOCUMENTS

| | | | | |
|---|---|---|---|---|
| 5,582,716 | A * | 12/1996 | Nurse, Jr. | 210/532.2 |
| 5,591,331 | A | 1/1997 | Nurse, Jr. | |
| 5,597,477 | A | 1/1997 | Harry | |
| 5,635,064 | A | 6/1997 | Bovington | |
| 5,645,732 | A | 7/1997 | Daniels | |
| 5,690,824 | A | 11/1997 | Stuth | |
| 5,759,393 | A | 6/1998 | Nurse, Jr. | |
| 5,795,472 | A | 8/1998 | Nurse, Jr. | |
| 5,904,847 | A | 5/1999 | Bovington | |
| 5,985,139 | A | 11/1999 | Zoeller | |
| 6,217,760 | B1 | 4/2001 | Bovington | |
| 6,231,764 | B1 | 5/2001 | Wilkins | |
| 6,261,452 | B1 * | 7/2001 | Mayer | 210/256 |
| 6,309,539 | B1 | 10/2001 | Mayer | |
| 6,334,958 | B1 | 1/2002 | Ruskin | |
| 6,372,137 | B1 | 4/2002 | Bounds | |
| 6,416,664 | B1 * | 7/2002 | Bovington | 210/299 |
| 6,540,920 | B2 | 4/2003 | Bounds et al. | |
| 6,773,606 | B2 * | 8/2004 | Wilkins et al. | 210/747 |
| 6,793,813 | B1 | 9/2004 | Ethridge | |
| 6,878,281 | B2 * | 4/2005 | Graves | 210/532.2 |
| 2003/0222033 | A1 | 12/2003 | Carroll et al. | |
| 2006/0201869 | A1 | 9/2006 | Collins et al. | |
| 2006/0226071 | A1 | 10/2006 | Allen et al. | |
| 2008/0164216 | A1 | 7/2008 | Collins et al. | |

OTHER PUBLICATIONS

Jeff A. Snowden, P.E.; PowerPoint slideshow: Dosing & Flow Equalization; TEHA Central Texas Chapter, San Marcos, TX, May 15-16, 2008; pp. 1-10.

Orenco Systems, Inc.; Installation Guide—AdvanTex-AX Treatment Systems; Feb. 2007; Rev. 3.4; pp. 1-32.

Orenco Systems, Inc.; http://www.orenco.com/eps; Product Catalog and product overviews; downloaded from the Internet on Dec. 12, 2008; pp. 1-23.

* cited by examiner

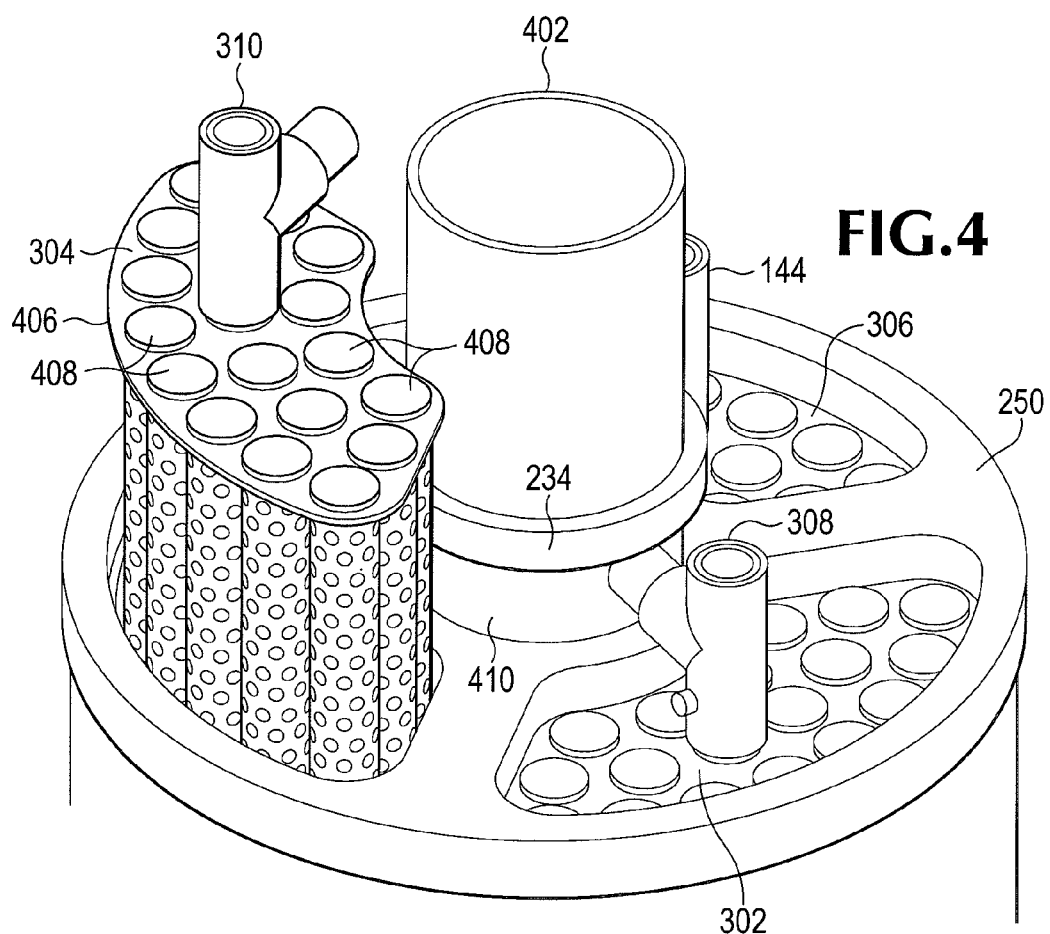
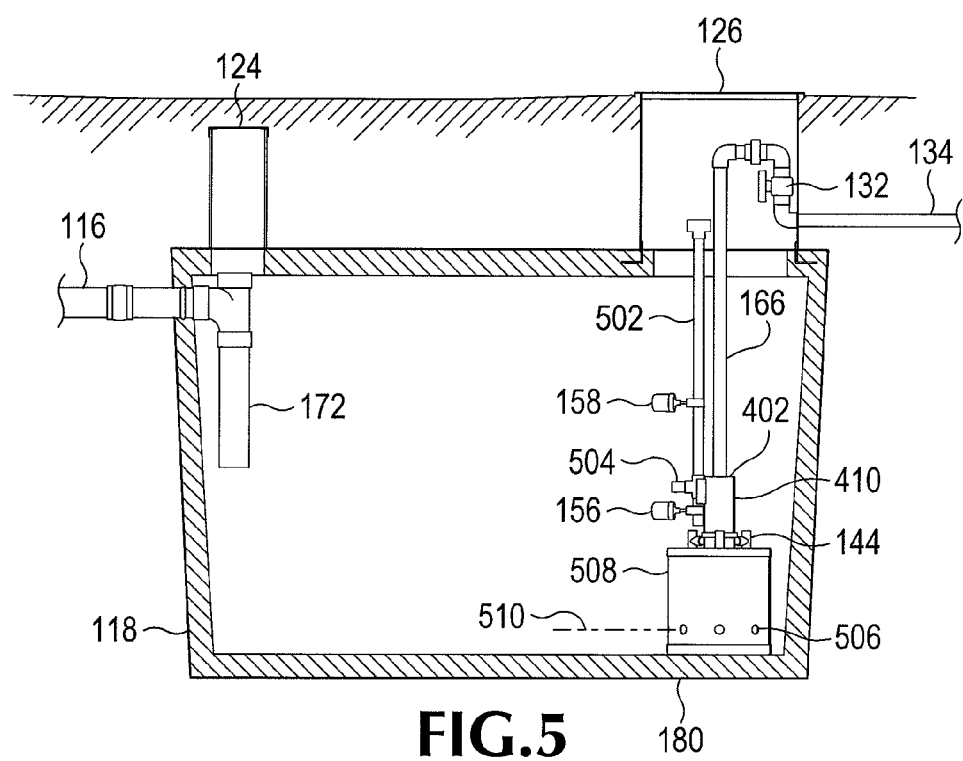

SECONDARY FILTERING AND DISCHARGING OF WASTEWATER

BACKGROUND OF THE INVENTION

This disclosure relates generally to filtering wastewater in a septic system, and, more particularly, to filtering wastewater in a secondary septic containment space and thereafter discharging the filtered effluent from the secondary septic containment space.

Treating wastewater such as sewage wastewater from residential or commercial buildings often includes collecting the raw untreated sewage in a wastewater containment space such as a septic tank. The untreated sewage having a significant concentration of waste solids flows into the septic tank whereafter solids separate from the liquid portion of the sewage. Solids having a lower density than the liquid move to the top of the liquid to form a scum layer, and solids having a higher density than the liquid sink to the bottom of the tank to form a sludge layer. Between the lower horizontal sludge layer and the upper horizontal scum layer a relatively clear liquid layer forms. Liquid from the relatively clear liquid layer is then typically filtered and discharged from the septic tank into a leach field or a secondary septic tank, or perhaps recirculated back into the primary septic tank depending upon such factors as the amount of waste solids remaining in the filtered effluent or other quality aspects of the filtered effluent, liquid loadings and other characteristics of the soil system (or leach field), capacities of the septic system to receive and treat wastewater during periods of peak flow, and various other factors, including local environmental regulations. Various systems may be designed to suit particular applications, but most systems include at least one septic tank, a leach field, and gravity-fed or active means of flowing effluent from the septic tank into the leach field.

In a gravity-fed system, effluent flows from a septic tank whenever wastewater is received into the tank causing the wastewater level in the tank to rise above the level of an effluent outlet. More sophisticated systems attempt to more evenly control liquid loadings into the soil system by intermittently discharging (or dosing) effluent from the septic tank with the use of an effluent pump. Such dosing systems commonly use float switches and timers to control the effluent pump and the amount and frequency of effluent discharged from the septic tank. The float switches are typically protected from becoming fouled within the septic tank by a protective open-topped housing that extends vertically from a lower level in the septic tank to above a maximum wastewater level of the tank, as disclosed in U.S. Pat. Nos. 5,492,635 and 5,531,894.

Wastewater treatment systems having more than a single septic tank or wastewater containment space may be used to further improve effluent quality before permanently discharging effluent from the septic system. For example, untreated wastewater may flow into a primary septic tank within which the waste solids distribute into a lower sludge layer, an upper scum later, and a relatively clear layer of liquid therebetween. Liquid from the relatively clear layer in the primary tank is then flowed into a secondary tank or secondary wastewater containment space. Even if the relatively clear liquid from the first septic tank is filtered before being discharged from the primary tank, a concentration of waste solids remains within the effluent received from the primary tank. Therefore, waste solids in the effluent received into the secondary tank from the primary tank will similarly distribute within the secondary tank into a horizontal lower sludge layer, a horizontal upper scum layer, and a relatively clear liquid layer therebetween. Liquid from the relatively clear liquid layer within the secondary tank may then be filtered and intermittently discharged from the secondary tank into a leach field or fed into a further wastewater treatment subsystem.

Exemplary systems which utilize a secondary wastewater containment space are disclosed in U.S. Pat. Nos. 5,531,894; 6,372,137; and 6,540,920. All of those systems involve flowing wastewater from the relatively clear liquid layer within the secondary containment space through a filter that is surrounded by an open-topped housing that extends vertically from a lower level in the secondary containment space to above a maximum wastewater level of the secondary containment space. The housing in each of those systems surrounds a submergible pump, one or more filtering elements, and float switches so as to prevent exposure of those components to the horizontal lower sludge layer and horizontal upper scum layer within the secondary containment space.

Although they may be effective for wastewater treatment generally, filtration and effluent discharge systems designed for use in primary septic tanks or systems having a single wastewater containment space are not optimized for secondary containment space applications. Filtration and effluent discharge systems designed to function within a secondary containment space, or in a separate tank following a primary septic tank, are desirable, especially if such systems can be made smaller and lighter. Smaller and lighter filtration and effluent discharge systems are needed that are easier to install and remove, clean, and replace during maintenance. Smaller and lighter systems are needed that require less material and are, therefore, less expensive to manufacture and sell.

BRIEF DESCRIPTION OF THE SEVERAL DRAWINGS

For a more complete understanding of the present invention, the drawings herein illustrate examples of the invention. The drawings, however, do not limit the scope of the invention. Similar references in the drawings indicate similar elements.

FIG. 4 is a perspective view showing insertion of exemplary filter cartridges into the pump vault of FIG. 2.

FIG. 5 is a partially sectional side view of the system of FIG. 1 having an alternative pump vault with shortened flow inducer.

DETAILED DESCRIPTION OF PREFERRED EMBODIMENTS

In the following detailed description, numerous specific details are set forth in order to provide a thorough understanding of various embodiments. However, those skilled in the art will understand that the present invention may be practiced without these specific details, that the present invention is not limited to the described embodiments, and that the present invention may be practiced in a variety of alternate embodiments. In other instances, well known methods, procedures, components, and systems have not been described in detail.

Figure 1:
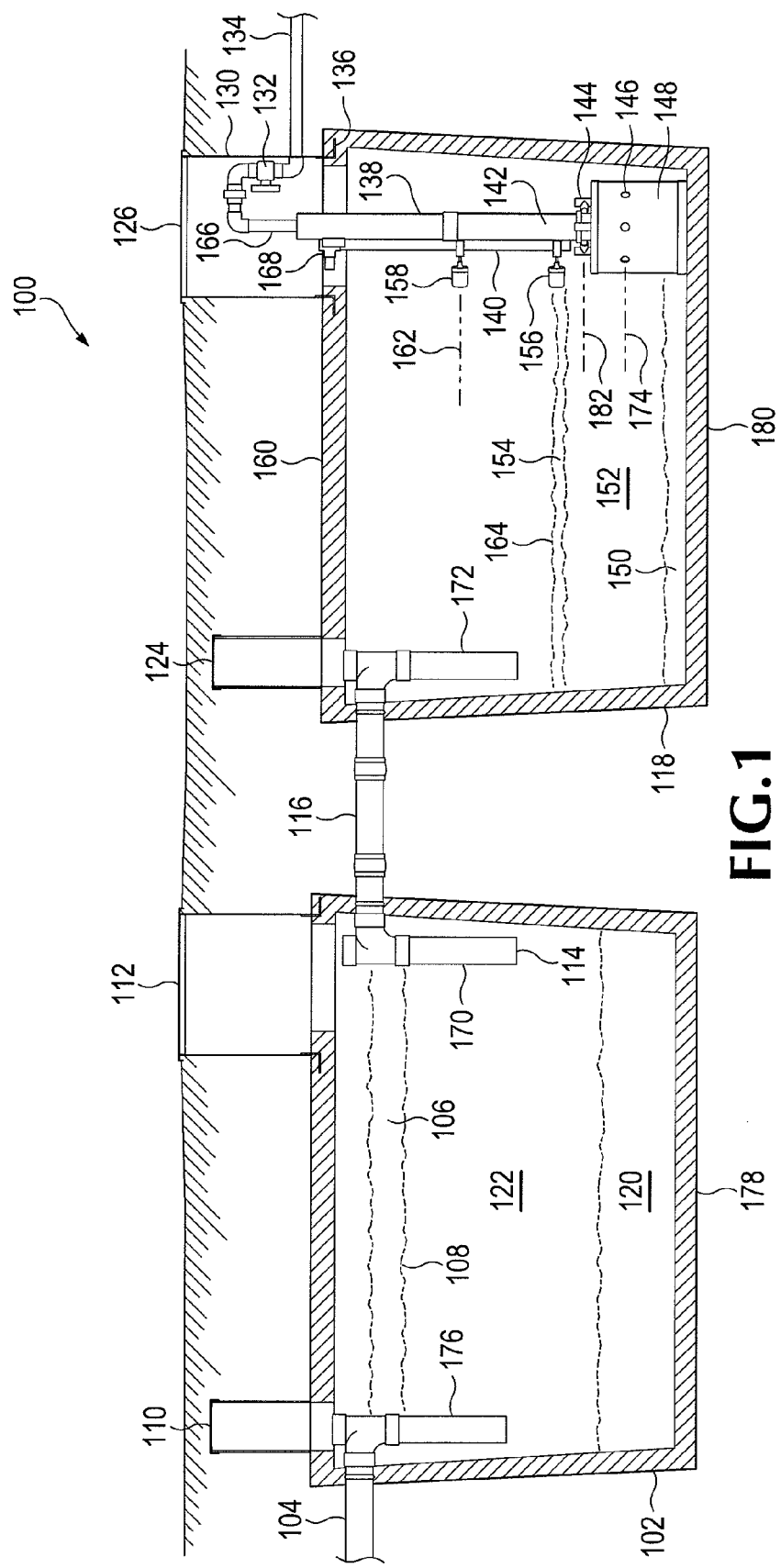
FIG. 1 is a partially sectional side view of an exemplary septic system having a secondary septic containment space from which effluent from a prior containment space is filtered and discharged.

A partially sectional side view of an exemplary septic system 100 having a secondary septic containment space 118 from which effluent from a prior containment space 102 is filtered and discharged is shown in FIG. 1. The septic system 100 may include a first septic containment space 102 and a second septic containment space 118, either or both of which may comprise separate septic tanks (as shown) or separate compartments (or chambers) within the same tank or separate containment spaces within a system having multiple separated septic containment spaces. The system 100 as shown in FIG. 1 includes two containment spaces 102, 118, each having a respective intake access riser 110, 124 and a respective effluent discharge access riser 112, 126. The system 100 is shown having a buried secondary containment space 118 oriented so as to gravitationally receive wastewater from a similarly buried but slightly elevated primary containment space 102, so that wastewater gravitationally flows from the primary containment space 102 into the secondary containment space 118. However, the containment spaces need not be buried nor depend upon gravity for receiving wastewater into the secondary containment space 118.

Raw untreated sewage having a substantial concentration of waste solids may flow, as from a residence or business establishment, into the first or primary septic containment space 102 via an influent conduit 104 and, optionally, an influent diverter 176, whereafter the waste solids distribute within the primary containment space 102 into an upper horizontal scum layer 106, a lower horizontal sludge layer 120, and a relatively clear layer 122 of liquid therebetween. As wastewater is introduced to the primary containment space 102, the wastewater level increases and is allowed to flow through an intra-containment space conduit 116. In the configuration shown in FIG. 1, a lower end 114 of a passively operative effluent discharge conduit 170 extends downwardly toward the bottom 178 of the containment space 102 so as to be at a wastewater level below that of the bottom 108 of the upper horizontal scum layer 106. As the wastewater level in the primary containment space 102 increases, liquid from the relatively clear layer 122 passes into the lower end 114 of the effluent discharge conduit 170 and is gravity-fed through the intra-containment space conduit 116 into the secondary containment space 118.

Other means of flowing liquid from the relatively clear layer 122 within the primary containment space 102 into the secondary containment space 118 may be used, and the liquid discharged from the primary containment space 118 may comprise filtered effluent. For example, any of the septic tank effluent filtering methods or effluent discharging methods disclosed in U.S. Pat. No. 6,540,920 (Bounds et al., filed Feb. 20, 2001); U.S. Pat. No. 6,372,137 (Bounds, filed Mar. 6, 2000); U.S. Pat. No. 5,531,894 (Ball et al., filed Nov. 18, 1993); U.S. Pat. No. 5,492,635 (Ball, filed Dec. 9, 1994); and U.S. Pat. No. 4,439,323 (Ball, filed May 24, 1982), the disclosures of which are hereby incorporated by reference, may be used. Some of the disclosed methods involve gravity-fed filtration and discharge of effluent from a primary septic containment space. Some involve the use of an effluent pump to discharge effluent from a primary septic containment space. Others involve flowing effluent from a first compartment within a septic tank into a second compartment within the septic tank.

In septic system applications where liquid from a relatively clear layer within an upstream or prior septic containment space flows into a downstream or subsequent septic containment space, the concentration of waste solids contained in the influent introduced into the subsequent septic containment space is reduced by at least the amount of waste solids that distributed to the upper scum and lower sludge layers within the prior septic containment space. For example, as shown in FIG. 1, wastewater comprising liquid from the relatively clear layer 122 within the primary septic containment space 102 contains a concentration of waste solids reduced by at least the amount of waste solids that distributed to the upper scum layer 106 and lower sludge layer 120. As shown, wastewater comprising liquid from the relatively clear layer 122 flows into the secondary containment space 118 via intra-containment space conduit 116 and, optionally, an influent diverter 172. The concentration of waste solids within the wastewater introduced into the secondary containment space 118 is then allowed to distribute in the secondary containment space into a lower horizontal sludge layer 150 and an upper horizontal scum layer 154 with a horizontal layer 152 of liquid therebetween.

The present inventor discovered that scum and sludge in a secondary septic containment space accumulates at a substantially lower rate than in a primary septic containment space and that, consequently, the lower accumulation rate allows for a smaller sized and lighter weight filtration and effluent discharging assembly (commonly referred to as a pump vault) than currently used in existing systems having a secondary septic containment space. The present inventor has invented various embodiments of a filtration and effluent discharging assembly adapted for secondary septic containment space applications. For example, a filtration and discharging assembly (or pump vault) 148 enclosing one or more filtration elements and having one or more inlets (or apertures) 146 for receiving liquid from the horizontal layer 152 may be positioned within a secondary septic containment space 118 substantially as shown in FIG. 1. The pump vault 148 is preferably fully submerged below a maximum wastewater level 164 of the secondary septic containment space 118, where the maximum wastewater level 164 is the upper surface of the scum layer 154 within the containment space 118 determined by an upper position of float switch 156. Also preferably, at least a portion of the pump vault 148 is submerged below a minimum wastewater level 182 of the secondary septic containment space 118, where the minimum wastewater level 182 is determined by a lower position of float switch 156.

As will be discussed in greater detail in the context of FIG. 2, liquid from the horizontal layer 152 is received into the pump vault 148 through one or more apertures 146 and then flowed through at least one of the one or more filter elements enclosed within the pump vault housing. Thereafter, the filtered effluent flows from the other side of at least one filter element, out of the pump vault housing, and into an effluent discharge conduit 166 via a submersible pump 142 set within a flow inducer 138. Controls (not shown) electrically connected to the pump control float switch 156 and submersible pump 142 are used to flow filtered effluent from the pump vault 148 intermittently. The filtered effluent flowed from the pump vault 148 may be discharged from the secondary septic containment space 118 through discharge outlet 134 into a leach field or a subsequent wastewater treatment subsystem. Alternatively, the filtered effluent flowed from the pump vault 148 may be fed back into one or both of the septic containment spaces 102, 118 as part of a recirculation system (not shown).

The pump vault 148 may be installed through an effluent discharge access riser 126 having side walls 130 extending downward and connected to a top 160 of the secondary containment space 118 using adapters 136. The pump vault 148 may rest on the bottom 180 of the secondary containment space 118, rest on an annular or other shaped member (not shown) resting on the bottom 180, or be partially suspended within the access riser 126 using supportive members (not shown) attached to upper surfaces of the flow inducer 138 or float switch assembly 140.

The float switch assembly 140 may be attached, as shown, to upper surfaces of the flow inducer 138 using a bracket 168 and may include a high wastewater level (or alarm) float switch 158 for triggering an alarm when wastewater within the containment space rises to an alarm level 162. Wiring (not shown) interconnecting the pump control float switch 156, the high level alarm float switch 158, and the submersible pump 142 to a control panel (not shown) may be routed through a water tight splice box (not shown) mounted within the side walls 130 of the access riser 126. The float switches and submersible pump preferably operate to maintain wastewater levels similar to the manner described in U.S. Pat. Nos. 5,492,635 and 4,439,323.

As shown in FIG. 1, the pump vault 148 is smaller, lighter, and less expensive to manufacture and sell than conventional pump vaults having an open-topped housing extending vertically from near the bottom 180 of the containment space to near or above the top 160 of the containment space. The smaller and lighter design is easier to handle when installing the septic system and performing routine maintenance. For example, the lower weight allows for easier lifting of the pump vault 148 through access riser 126 for removal and cleaning of filter elements which may be arranged within the pump vault in one or more filter cartridges, an exemplary handle 144 of which is shown in FIG. 1.

Figure 2:
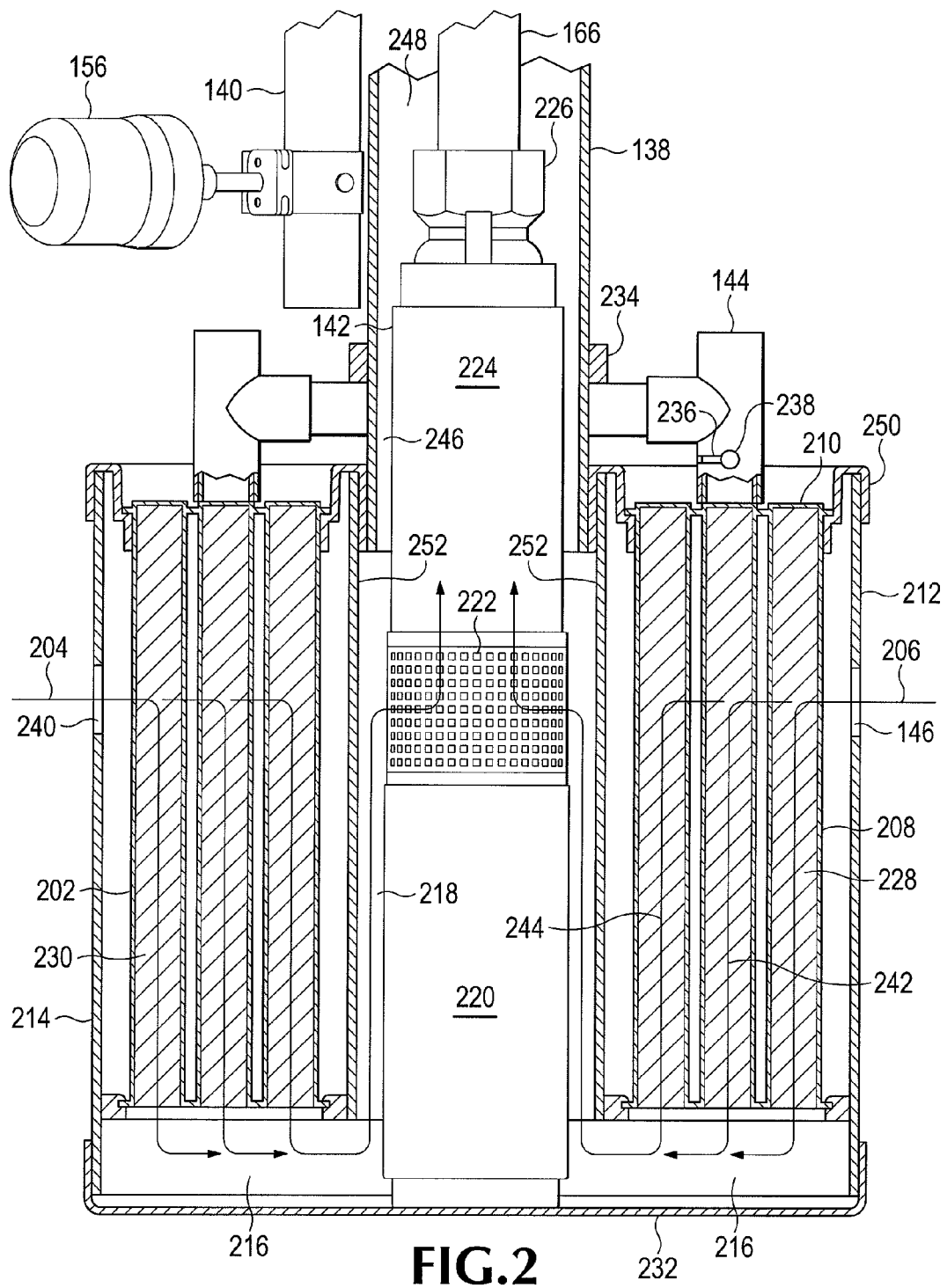
FIG. 2 is a partial sectional view of the exemplary pump vault of FIG. 1.
Figure 3:
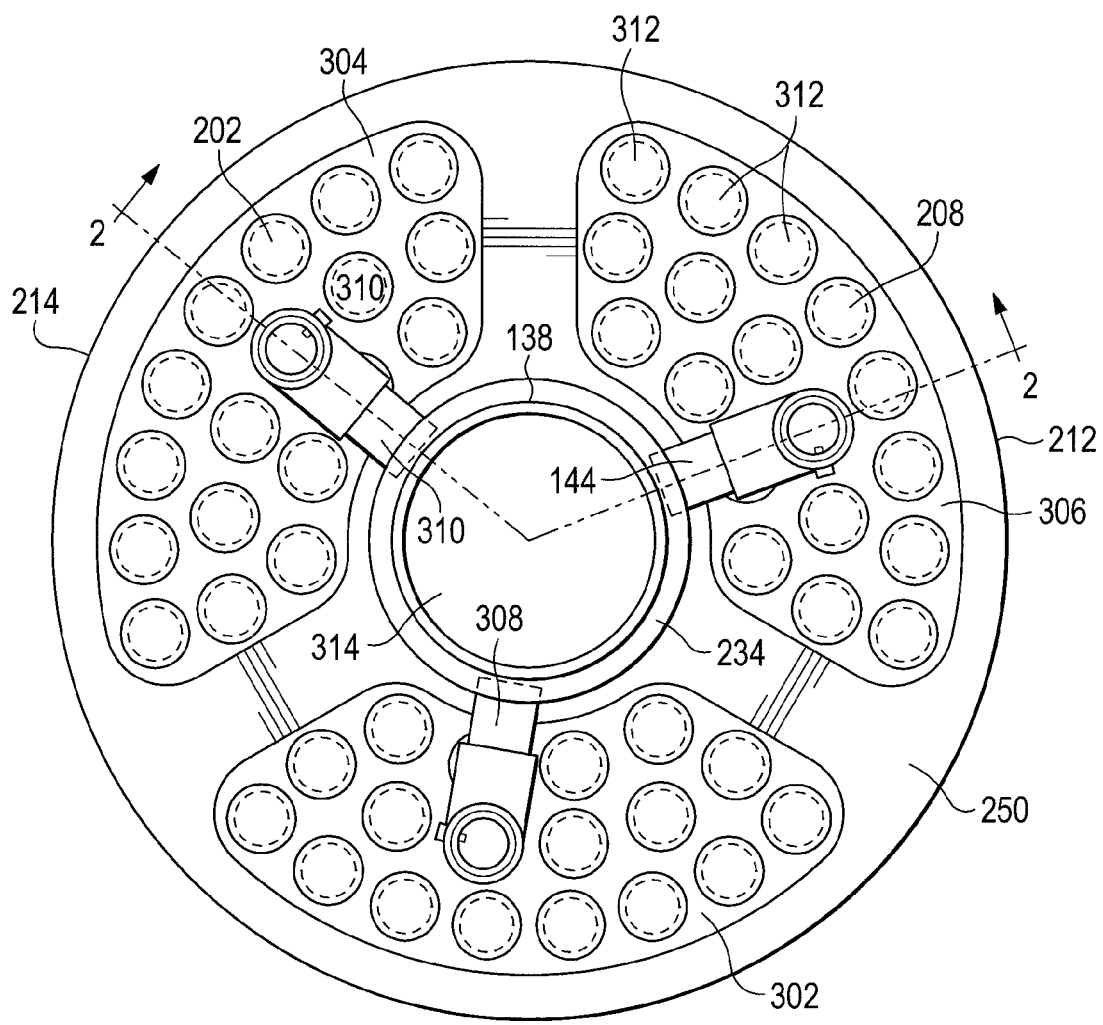
FIG. 3 is a top view of the exemplary pump vault of FIG. 2.

FIGS. 2-4 provide greater detail for preferred embodiments involving multiple filter elements grouped into removable filter cartridges. FIG. 2 is a partially sectional view approximately along the cut line 2-2 identified in the top view of FIG. 3, and FIG. 4 is a perspective view showing an exemplary filter cartridge partially removed from the pump vault. As shown, handle 144 preferably rotates inward toward the flow inducer 138 surface so that an inward end of the handle 144 fits beneath retaining material 234 on the flow inducer 138 surface so as to prevent upward vertical movement of the handle 144. The handle 144 is preferably fabricated from tubular material and arranged in an interlocking manner having a cooperative slot 236 and pin 238 for rotatably fastening the handle 144 to the top of the filter cartridge.

In a preferred embodiment the pump vault 148 includes three removable filter cartridges 302, 304, 306, each one having multiple tubular mesh screen filter elements 312 substantially as described in U.S. Pat. No. 5,492,635 except that each of the filter elements are sealed at the top as illustrated in FIG. 4. The filter cartridge 304 having handle 310 is shown partially removed. The tops 408 of the filter elements are sealed with the tubular mesh screen filter enclosures extending downward from a filter cartridge top plate 406. The top plate 406 fits into a matching opening in the top 250 of the pump vault housing.

Referring back to FIG. 2, the pump vault 148 preferably comprises a housing having a top 250, a bottom 232, and sides 212, 214 extending therebetween and together enclosing an interior of the housing. Enclosed within the housing is at least one filter element, which is preferably of, but not limited to, the filter types described in U.S. Pat. Nos. 5,492,635 and 4,439,323. Most preferably, however, the housing encloses multiple tubular mesh screen filter elements such as filter elements 202 and 208 shown in FIG. 2. The filter elements 202, 208 are preferably substantially as described in U.S. Pat. No. 5,492,635, except that each of the filter elements is sealed at the top as indicated by seal 210, thereby preventing the flow of liquid through the tops of the filter elements. For example, as liquid from the horizontal layer 152 flows into the interior of the housing through aperture 146 the liquid must flow from one side of at least one filter element to the other side in order to flow downward into a lower chamber 216 and then upward through a liquid effluent outlet 314 in the housing formed by outlet sides 252 (and shown in the top view of FIG. 3).

More specifically, as shown by flow line 206 in FIG. 2, liquid from the horizontal layer 152 flows through aperture 146, through a side of filter element 208, downward on the other side (i.e. within the tubular mesh screen enclosure 228) of filter element 208, and into the lower chamber 216. As shown by flow lines 242 and 244, liquid may flow from within the tubular mesh screen enclosure 228 into and downward through any number of adjacent tubular mesh screen enclosures toward the lower chamber 216. In similar fashion, as shown by flow line 204, liquid from the horizontal layer 152 may flow through an aperture 240, through a side of filter element 202, downward on the other side (i.e. within the tubular mesh screen enclosure 230) of filter element 202, and into the lower chamber 216. From the lower chamber 216, the filtered effluent flows upward through a gap 218 between outlet sides 252 and the lower portion 220 of the pump body 224, into at least one pump intake port 222, and finally into the effluent discharge conduit 166.

The flow inducer 138 is shown in FIG. 2 extending upward from the top 250 of the housing. In a preferred embodiment, the flow inducer 138 extends upward from the top 250 of the pump vault housing to above a maximum wastewater level 164 of the secondary septic containment space 118. In a preferred embodiment, as shown in FIG. 1, the flow inducer 138 extends well above the maximum wastewater level 164, to above the top 160 of the containment space 118. The submersible pump 142 fits within the flow inducer 138, as shown in FIG. 2, with the gap 218 between the lower portion 220 of the pump body 224 and the outlet sides 252 in fluid communication with both a gap 246 between side walls of the flow inducer 138 and an upper portion of the pump body 224, and a gap 248 between side walls of the flow inducer 138 and the effluent discharge conduit 166. Liquid from the lower chamber 216 is allowed to flow into the gaps 218, 246, and 248 up to a level within the flow inducer equal to the wastewater level in the secondary containment space 118.

The present inventor discovered that the flow inducer may be substantially shortened by incorporating a seal between the upper portion of the pump body 224 just above the top 250 of the pump vault housing. In one embodiment, the flow inducer 410 shown in FIGS. 4-6 extends upward from the top 250 to an upper end 402 and is substantially shorter than the flow inducer 138 in FIG. 1. The flow inducer 410 need not extend above a maximum wastewater level 164 or even above a minimum wastewater level 182 due to a seal 612 preventing fluid communication between the gaps 218, 610 below the seal 612 and gap 608 above the seal 612. The flow inducer 410, as shown, extends to the upper end 402 in order to provide for attachment of the float switch assembly 502. If the float switch assembly 502 is attached elsewhere, for example using a bracket (not shown) attaching the float switch assembly 502 to the effluent discharge conduit 166, the flow inducer 410 may extend upward just beyond the seal 612 or just beyond retaining material 234.

Figure 6:
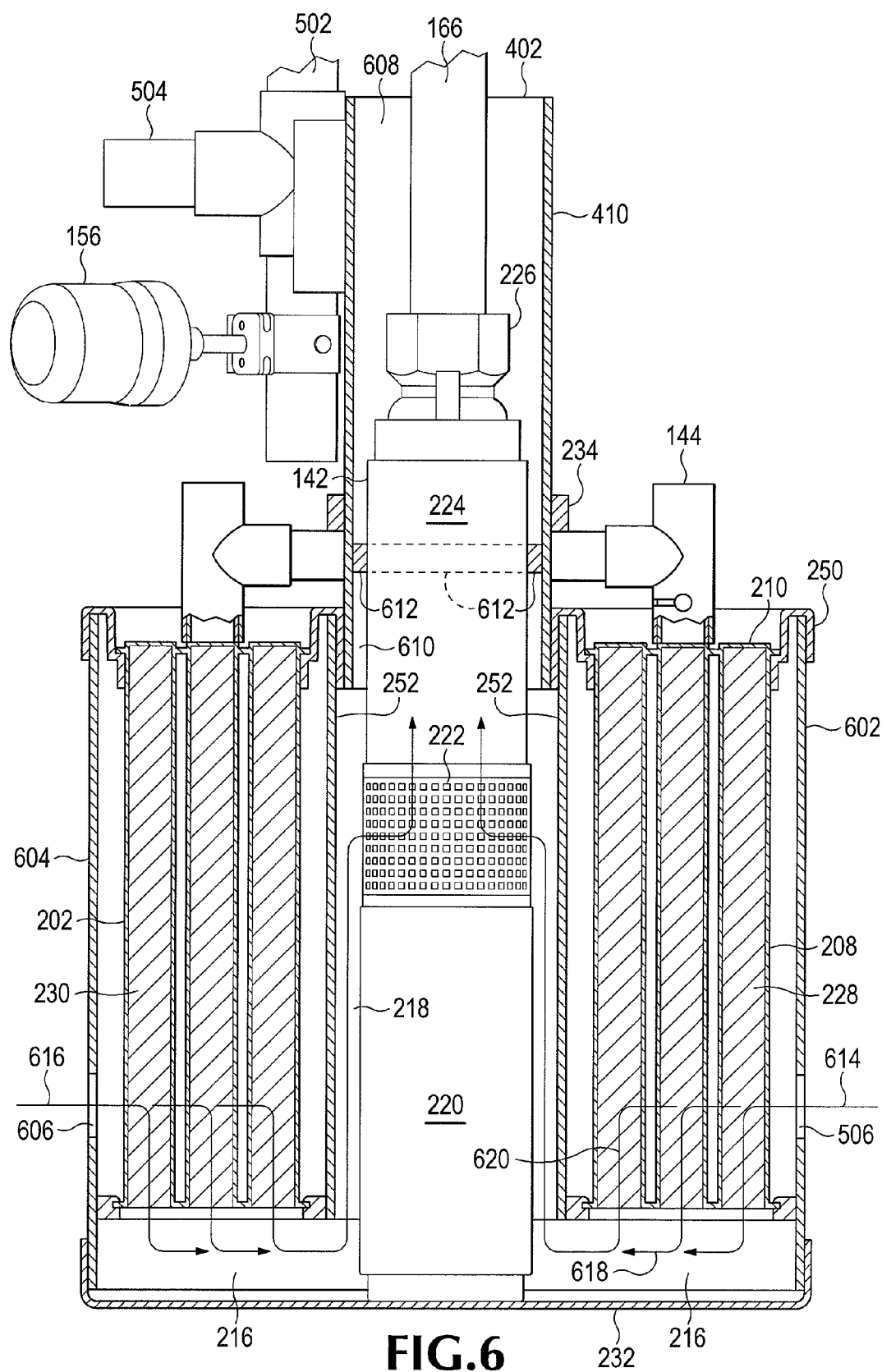
FIG. 6 is a partial sectional view of the alternative pump vault of FIG. 5.

The present inventor further discovered that incorporation of the seal 612 allows the pump 142 to remove effluent from the containment space 118 to a wastewater level 506 below the wastewater level of the pump intake port 222. The pump vault 508 shown in FIG. 5 may have one or more apertures 506 at a wastewater level 510, which is lower than the wastewater level 174 indicated in FIG. 1 for the one or more apertures 146. As shown in FIG. 6, the pump vault 508 preferably comprises a housing having a top 250, a bottom 232, and sides 602, 604 extending therebetween where the one or more apertures 506, 606 may be positioned below the level of the pump intake port 222. Liquid flow indicated by the flow lines 614, 616, 618, and 620 may be as described for the respective flow lines 206, 204, 242, and 244 in FIG. 2.

In applications where filtration is not necessary, such as in pump tanks, disinfection systems, effluent reuse systems, cisterns, fire sprinkler reservoirs, and the like, a submersible effluent pump assembly may be used. The pump assembly includes a flow inducer and float switch assembly similar to the flow inducer 138 and float switch assembly 140 shown in FIG. 1, except the flow inducer extends farther downward substantially parallel to the sides of the lower portion 220 of the pump 142 (the downwardly extending flow inducer being in place of the outlet sides 252) and connecting with a bottom similar to the housing bottom 232 in FIG. 2. One or more apertures near the bottom (or base) allow liquid to flow into a gap between the flow inducer and lower portion of the pump body, into a pump intake, and into an effluent discharge conduit.

Figure 7:
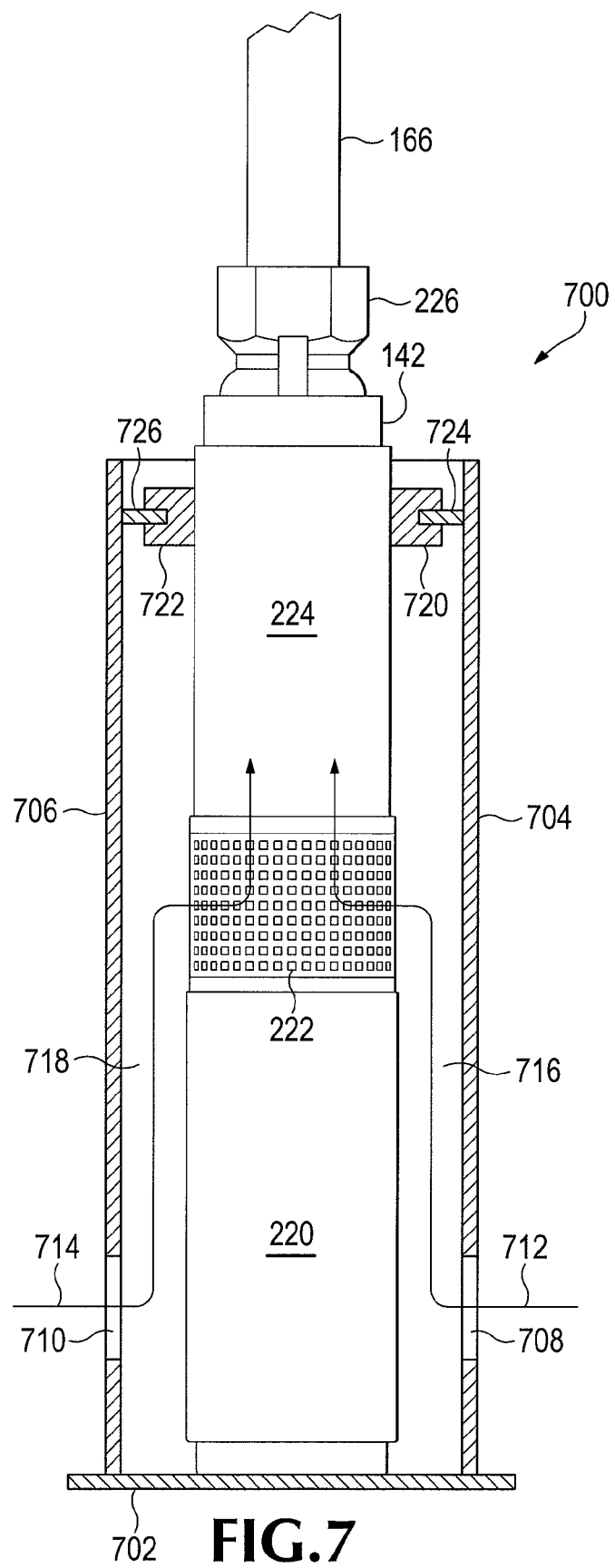
FIG. 7 is a partial sectional view of an exemplary effluent pump assembly having a shortened flow inducer.

The present inventor discovered that, similar to a system using pump vault 508, substantially less material is required for a submersible effluent pump assembly having a shortened flow inducer. FIG. 7 shows a submersible effluent pump assembly 700 adapted for removing a liquid from a liquid containment space. Preferably, the submersible effluent pump assembly 700 includes a pump 142 having a pump body 224 and at least one liquid intake port 222 thereon. The pump 142 is preferably capable of receiving liquid into the intake port 222 and flowing the liquid from the intake port 222 into a discharge conduit 166 sealably connected via connector 226 to the pump body 224. The discharge conduit 166 preferably extends away from the intake port 222 such that when the intake port 222 is positioned at a lower liquid level within the liquid containment space the conduit 166 extends upward above a maximum liquid level of the liquid containment space. The submersible effluent pump assembly 700 preferably includes a flow inducer having a bottom 702 and sides 704, 706 extending therefrom. The flow inducer sealably encloses via seal 720, 722 at least a lower portion 220 of the pump body 224, and the lower portion 220 includes the intake port 222. Flow inducer sides 704, 706 preferably extend upward to a liquid level below that of the maximum liquid level of the containment space when the intake port 222 is positioned at the lower liquid level. The pump assembly 700 further includes one or more inlets 708, 710 in the flow inducer sides 704, 706 through which the liquid may flow into a gap 716, 718 between the sides 704, 706 and the pump body 224.

In a preferred embodiment, the one or more inlets 708, 710 in the flow inducer sides 704, 706 are positioned in relation to the liquid containment space at a liquid level below that of the intake port 222, and the pump assembly 700 is capable of removing the liquid from the liquid containment space to a liquid level below that of the intake port 222. As shown by flow lines 712, 714 in FIG. 7, liquid may flow through one or more inlets 708, 710 into the gap 716, 718, then into the pump intake port 222, and finally upward into the effluent discharge conduit 166. The seal 720, 722 may take the form as shown in FIG. 7 of an annular C-shaped ring gripping inward extensions 724, 726 protruding inwardly from the sides 704, 706. Alternatively, the seal 720, 722 may take a form substantially similar to the seal 612 in FIG. 6. Other types and arrangements of seals may be used.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A method of treating wastewater, comprising:
(a) receiving wastewater having a concentration of waste solids from a first septic containment space, in which some of said waste solids have been removed from said wastewater, into a second septic containment space and allowing said concentration of waste solids to distribute in said second septic containment space into a lower horizontal sludge layer and an upper horizontal scum layer of said wastewater with a horizontal layer of liquid therebetween, wherein said wastewater in said horizontal layer has not yet been filtered in said second septic containment space;
(b) enclosing one or more filter elements in a housing within said second septic containment space, said housing having a top, a bottom, and sides extending therebetween and together enclosing an interior of said housing;
(c) submerging said one or more filter elements enclosed in said housing in said wastewater within said second septic containment space;
(d) submerging said top of said housing below a maximum wastewater level of said second septic containment space and exposing said top of said housing to said wastewater in said horizontal layer;
(e) flowing said liquid from said horizontal layer through one or more apertures in said housing into said interior of said housing;
(f) flowing said liquid from one side of at least one of said one or more filter elements to an opposite side thereof; and
(g) flowing said liquid from said opposite side through a liquid effluent outlet in said housing.

2. The method of claim 1 wherein step (g) includes flowing said liquid intermittently through said liquid effluent outlet.

3. The method of claim 1 including, following step (g), discharging said liquid from said second septic containment space by flowing said liquid through a septic liquid effluent discharge outlet of said second septic containment space.

4. The method of claim 1 including removing said one or more filter elements from said housing while said top of said housing is lifted above said maximum wastewater level of said second septic containment space, said one or more filter elements comprising at least one filter cartridge.

5. The method of claim 4 including providing said filter cartridge with a locking handle which may be used to lift said filter cartridge out of said housing.

6. The method of claim 5 wherein said locking handle is rotatable and the method includes providing a detent for engaging with said handle and preventing said cartridge from being removed from said housing.

7. The method of claim 1 wherein step (d) includes submerging at least a portion of said housing below a minimum wastewater level of said second septic containment space.

8. The method of claim 1 including sealing said top of said housing to prevent wastewater in said horizontal layer from entering said housing through said top.

9. The method of claim 1 wherein said wastewater entering said second septic containment space from first septic containment space was not filtered in said first septic containment space.

10. A method of treating wastewater, comprising:
(a) flowing wastewater having a first concentration of waste solids into a first septic containment space and allowing said first concentration of waste solids to distribute in said first septic containment space into a first lower horizontal sludge layer and a first upper horizontal scum layer of said wastewater with a first horizontal layer of liquid therebetween;
(b) flowing wastewater from said first horizontal layer of liquid having a second concentration of waste solids, in which some of said waste solids have been removed from said wastewater, into a second septic containment space and allowing said second concentration of waste solids to distribute in said second septic containment space into a second lower horizontal sludge layer and a second upper horizontal scum layer of said wastewater with a second horizontal layer of liquid therebetween wherein said wastewater in said second horizontal layer has not yet been filtered in said second septic containment space;
(c) enclosing one or more filter elements in a housing within said second septic containment space, said housing having a top, a bottom, and sides extending therebetween and together enclosing an interior of said housing;
(d) submerging said one or more filter elements in said housing in said wastewater within said second septic containment space;
(e) submerging said top of said housing below a maximum wastewater liquid level of said second septic containment space and exposing said top of said housing to said wastewater in said second horizontal layer;
(f) flowing liquid from said second horizontal layer through one or more apertures in said housing into said interior of said housing;
(g) flowing said liquid from one side of at least one of said one or more filter elements to an opposite side thereof; and
(h) flowing said liquid from said opposite side through a liquid effluent outlet in said housing.

11. The method of claim 10 wherein step (h) includes flowing said liquid intermittently through said liquid effluent outlet.

12. The method of claim 10 including, following step (h), discharging said liquid from said second septic containment space by flowing said liquid through a septic liquid effluent discharge outlet of said second septic containment space.

13. The method of claim 10 including removing said one or more filter elements from said housing while said top of said housing is lifted above said maximum wastewater level of said second septic containment space, said one or more filter elements comprising at least one filter cartridge.

14. The method of claim 13 including providing said filter cartridge with a locking handle which may be used to lift said filter cartridge out of said housing.

15. The method of claim 14 wherein said locking handle is rotatable and the method includes providing a detent for engaging with said handle and preventing said cartridge from being removed from said housing.

16. The method of claim 10 wherein step (e) includes submerging at least a portion of said housing below a minimum wastewater liquid level of said second septic containment space.

17. The method of claim 10 including sealing said top of said housing to prevent wastewater from said second horizontal layer from entering said housing from said top.

18. The method of claim 10 wherein said wastewater entering said second septic containment space from first septic containment space was not filtered in said first septic containment space.

* * * * *